2,770,806

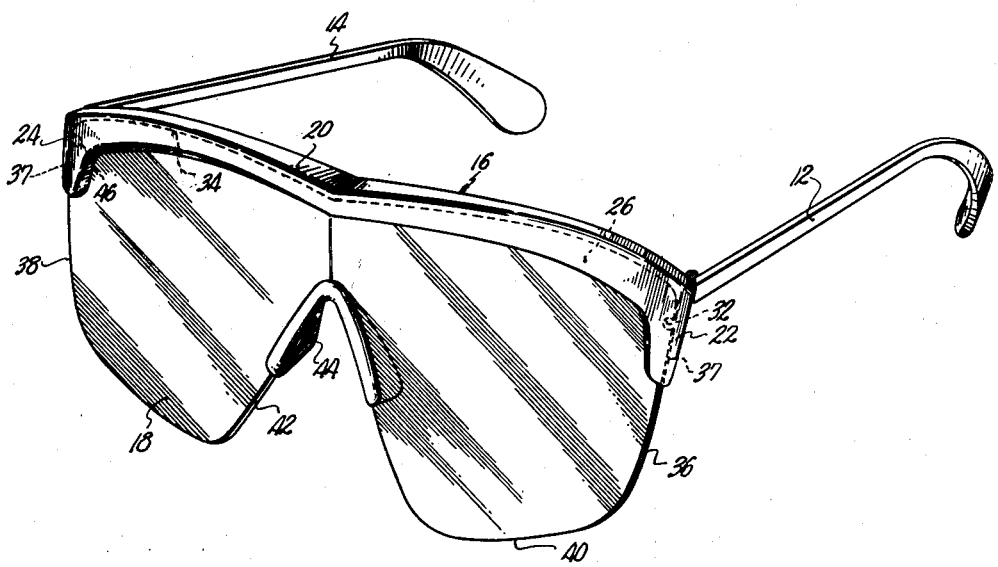

PARTIAL FRAME TYPE SPECTACLES HAVING REMOVABLE SHIELD SECTION

William C. Moeller, Kansas City, Mo., assignor to Parmelee Plastics Company, Kansas City, Mo., a corporation of Missouri Application September 7, 1954, Serial No. 454,376

1 Claim. (Cl. 2—12)

This invention relates to eye protecting devices and, more particularly, to such articles having the characteristics of a spectacle assembly for safeguarding the eyes of the wearer against dust, sparks and other flying particles as well as against glare from intense light sources.

One of the most important objects of the present invention is to provide spectacles having a specially formed frame section, which section has means adapting the same to permit quick and ready insertion or removal of a coacting, transparent eye shield.

Another important object of the present invention is the provision of an eye protecting device wherein is included a partial frame formed with a groove therein for embracing only the upper, marginal edges of a flexible shield so that the remainder of the shield may be manipulated manually to facilitate insertion thereof into the groove, and further, so as to maintain the frame and shield interlocked for quick separation.

The eye protecting device capable of fulfilling these and other objects comprises generally a partial frame formed with a groove and web interengageable with the notched, marginal edge of a cooperating shield, the inherent flexibility of the material of the frame and shield permitting a quick, interlocking relationship.

In the drawing:

Figure 1 is a perspective view of a partial frame-type spectacle having removable shield section made in accordance with the teachings of the present invention.

Fig. 2 is a fragmentary, reduced scale, side elevational view thereof.

Fig. 3 is an enlarged, fragmentary, sectional view taken on line III—III of Fig. 2.

Fig. 4 is an enlarged, fragmentary, exploded and elevational view of the spectacle assembly of Fig. 1, parts being broken away and in section to reveal details of construction; and Fig. 5 is an enlarged, fragmentary, end elevational view illustrating the shield and frame elements of the spectacle assembly of Fig. 4 in interlocked condition.

The illustrated embodiment of the invention shown in the accompanying drawing comprises a pair of temple-engaging members 12 and 14, a partial frame 16 and an eye-protecting shield 18.

Frame 16 is formed of plastic or other suitable, relatively rigid, yet sufficiently flexible material, is U-shaped, having a bight portion 20 and a pair of relatively short, depending leg portions 22 and 24 respectively. As best illustrated in Fig. 2, bight portion 20 of frame 16 is contoured arcuately to conform generally to the face of the wearer. Temple-engaging members 12—14 are hingedly attached to the frame 16 at each end thereof respectively. U-shaped frame 16 is provided with a continuous groove 26 formed in the inner side walls of portions 20, 22 and 24 thereof, presenting a pair of inwardly extending flanges 28 and 30. Intermediate the ends of each of the leg portions 22 and 24, within groove 26, there is provided an integral web 32.

Shield 18 is cut or stamped from a sheet of any suitable transparent, flexible material. As shown in Fig. 1, the elongated shield 18 has an upper, longitudinal edge 34 which is complemental to the bight portion 20 of frame 16, a pair of end edges 36 and 38 and a lower, longitudinal edge 40. Each of the end edges 36—38 has an inwardly inclined length 37 at the normally uppermost end thereof. Intermediate its ends, lower edge 40 is provided with a suitable recess 42 adapted to receive the nose of the wearer. For purposes of comfort, each shield 18 has a conventional, nose-bridging element 44. Each end edge 36—38 of shield 18 has a notch 46 formed therein adjacent the length 37 and complemental with the corresponding web 32.

Frame 16 and shield 18 are sufficiently flexible to permit the insertion of the upper marginal edge 34 and the uppermost marginal portions of end edges 36 and 38 of shield 18 into groove 26 of frame 16, as well as the wedging of webs 32 into notches 46. As shield 18 is inserted, the lengths 37 of end edges 36 and 38 engage the webs 32 to spread the leg portions 22 and 24 until webs 32 snap into notches 46. When shield 18 has been inserted into the groove 26 between flanges 28 and 30, shield 18 assumes the same arcuate configuration of bight portion 20 of frame 16, as illustrated in Fig. 2.

As best shown in Fig. 1, flanges 28 and 30 overlap the marginal edges of shield 18 throughout the length of groove 26, and webs 32 prevent movement of shield 18 relative to frame 16 whereupon the spectacle assembly is ready for normal use without fear or accidental maladjustment of the parts. Should it become desirable to replace shield 18, the same may be removed and replaced quickly by manually manipulating the parts sufficiently to disengage webs 32 and notches 46.

It is obvious that the embodiment herein disclosed is a preferred form only and that many changes or modifications may be made therein without departing from the broad principles of the present invention. Such changes or modifications are contemplated hereby and it is, therefore, desired to be limited only by the scope of the appended claim.

Having thus described the invention what is claimed as new and desired to be secured by Letters Patent is:

In a spectacle assembly, an elongated, relatively flexible, transparent eye shield having a nose-receiving notch in the normally lowermost, longitudinal edge thereof and a web-receiving notch of major, substantially circularly segmental configuration in each end edge thereof respectively, said web-receiving notches being disposed between the longitudinal edges of the shield, each end edge being convexly curved between said web-receiving notch thereof and the normally uppermost, longitudinal edge of the shield; and a resilient, inverted U-shaped frame having an elongated, bight portion substantially coextensive in length with said uppermost edge of the shield and a pair of depending leg portions, said frame being provided with a continuous, inwardly-facing groove intermediate its thickness, that part of said groove disposed within said bight portion being substantially complemental to a marginal portion of the shield disposed along said uppermost edge of the latter, those parts of said groove disposed within said leg portions being substantially complemental to marginal portions of the shield disposed along corresponding end edges of the latter, there being an integral web of substantially circular cross-section and of diameter slightly greater than the distance across the open extremity of a corresponding web-receiving notch into which it is adapted to be snapably received extending transversely across said groove in each of said leg portions respectively, said webs being disposed for seating in said web-receiving notches when said uppermost edge and a portion of said end edges of the shield are substantially fully seated within said groove of the frame, the lowermost extremities of said leg portions being transversely bifurcated to provide guide notches adapted to slide along said curved portion of the end edges during assembly of the shield into the frame.

References Cited in the file of this patent

UNITED STATES PATENTS

| | | |
|---|---|---|
| 2,385,975 | Ellestad | Oct. 2, 1945 |
| 2,388,205 | Bernheim et al. | Oct. 30, 1945 |
| 2,529,068 | Bernheim | Nov. 7, 1950 |
| 2,529,110 | Splaine | Nov. 7, 1950 |

FOREIGN PATENTS

| | | |
|---|---|---|
| 1,022,344 | France | Dec. 17, 1952 |